UNITED STATES PATENT OFFICE.

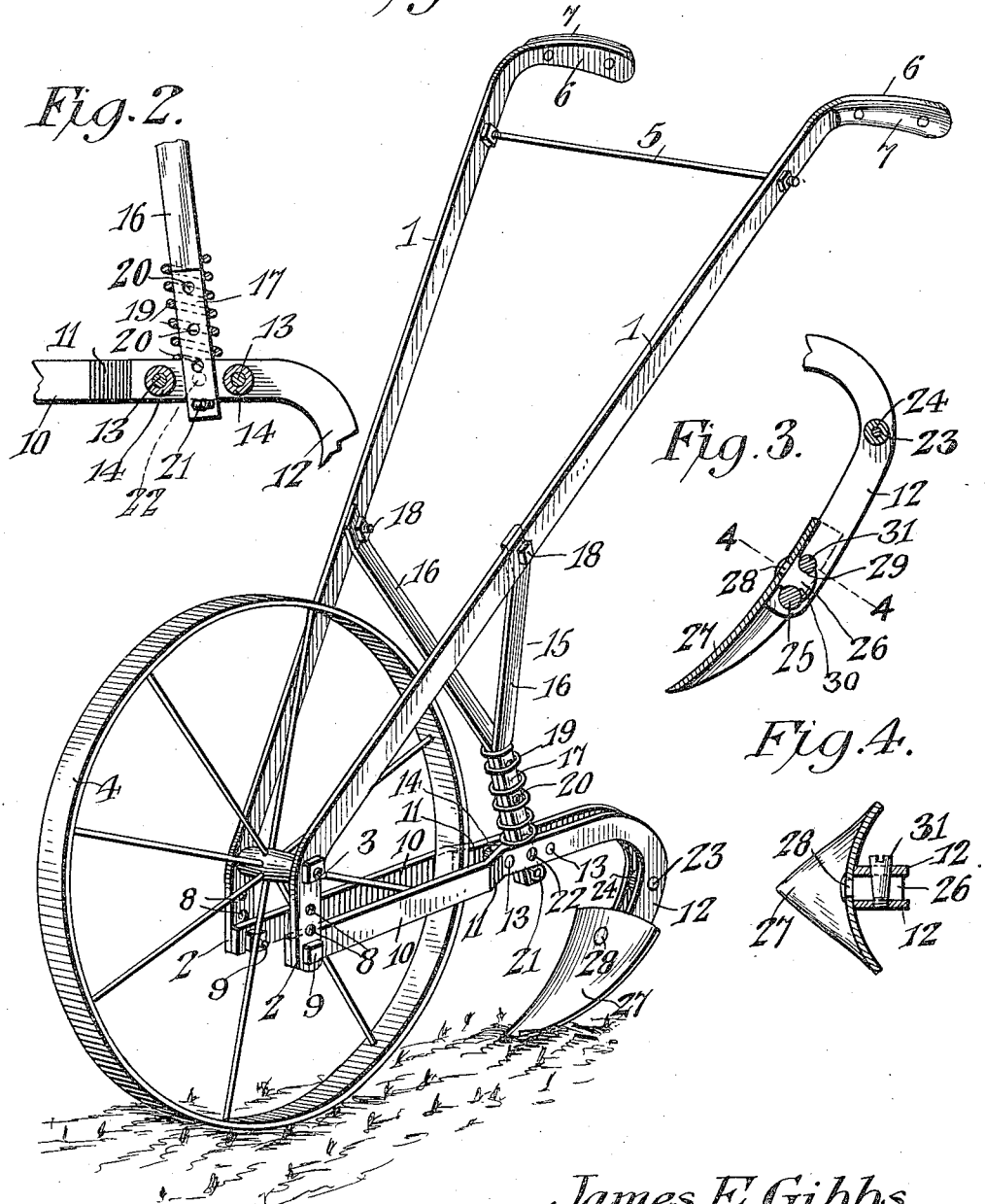

JAMES EDWIN GIBBS, OF COVINGTON, KENTUCKY.

HAND-PLOW.

1,031,996.  Specification of Letters Patent.  Patented July 9, 1912.

Application filed May 8, 1911. Serial No. 625,811.

*To all whom it may concern:*

Be it known that I, JAMES E. GIBBS, a citizen of the United States, residing at Covington, in the county of Kenton and State of Kentucky, have invented a new and useful Hand-Plow, of which the following is a specification.

The invention relates to improvements in hand plows.

The object of the present invention is to improve the construction of hand plows, and to provide a simple, efficient and comparatively inexpensive plow of this character, designed for cultivating gardens, raking lawns, and similar work, and adapted to be readily adjusted to suit the various uses to which it may be put, and capable of being arranged for operating on either light smooth soil or hard ground.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a perspective view of a hand plow, constructed in accordance with this invention. Fig. 2 is a detail sectional view, illustrating the construction of the adjustable connection between the handle bars and the side beams. Fig. 3 is a vertical sectional view of the standard and the soil engaging device. Fig. 4 is a transverse sectional view of the same on the line 4—4 of Fig. 3.

Like numerals of reference designate corresponding parts in all the figures of the drawing.

In the accompanying drawing in which is illustrated the preferred embodiment of the invention, 1—1 designate inclined handle bars, constructed of suitable material and converging downwardly and forwardly and having downwardly extending approximately vertically arranged terminal arms or portions 2, arranged at an obtuse angle to the inclined portions of the bars 1, which are slightly curved at the upper terminals of the arms or portions 2. The side bars are provided at the said curved portions with perforations for the reception of a transverse bolt 3, upon which is mounted a ground wheel 4. The upper rear portions of the side or handle bars 1 are connected by a transverse rod 5, and the rear terminals of the said bars 1 are also arranged at an angle to form handles 6, which are preferably equipped with wooden grips 7.

The front depending arms or portions are provided at intervals with perforations 8 for the reception of bolts 9, which adjustably connect the front terminals of the approximately horizontal side beams 10 to the front ends of the bars 1. The side beams 10 have their front portions spaced apart to receive the ground wheel between them, and they are preferably fitted against the inner faces of the depending terminal portions 2 of the handle bars 1, and are adapted to be adjusted vertically by means of the perforations 8 and the bolts 9. The side beams are bent inwardly at an intermediate point at 11 to arrange their rear portions closer together, and they have downwardly and forwardly extending portions 12, forming a rear standard for supporting a soil engaging device.

The rear portions of the side beams are connected with each other adjacent to the bend 11 by spaced transverse fastening devices 13, on which are mounted spacing sleeves 14. The rear portions of the side beams are also connected with the handle bars by means of an approximately Y-shaped brace 15, preferably composed of two bars or members, and having laterally inclined upwardly diverging arms 16 and a lower stem 17. The bars or members of the brace are provided with straight lower portions secured flat against each other to form the stem 17, and they are spread to provide the upwardly diverging arms 16, which are secured to the inner faces of the handle bars 1 by means of the bolts 18. The stem 17 is arranged between the rear portions of the side beams, and it extends through the space between the spacing sleeves, and it has a coiled spring 19, disposed on it to form a yieldable connection between the handle bars and the side beams. The stem is also provided with a plurality of perforations 20, arranged at intervals and adapted to receive a transverse pin or key 21, which may be arranged to engage either the lower edges of the side beams, or be passed through transversely alined perforations 22 of the same. When the pin or key is located beneath the side beams, the spring operates to form the said yieldable connection, and this arrangement is designed to be employed when the soil operated on is light and smooth. If, however, the ground should be hard, the pin or key is transferred from its position beneath the side beams to the perforations 22 thereof, and it is adapted to connect the brace 15 adjustably and rigidly to the side beams.

The rear portions of the side beams are connected at the upper ends of the standard by means of a transverse fastening device 23, which supports the spacing sleeve 24 interposed between the sides of the standard, as clearly shown in Figs. 1 and 4. The lower ends of the sides of the standard are connected by a transverse fastening device 25, which is detachably engaged by a block or piece 26 of a soil engaging shovel or blade 27. Various kinds of soil engaging devices may be mounted on the standard, and the plow is also adapted to be equipped with a rake for use on a lawn after the grass has been cut. As any form of rake may be employed, illustration thereof is deemed unnecessary. The block or piece 26, which is rigidly secured to the blade or shovel 27 by a shank 28, is flat sided and fits snugly between the spaced sides of the standard and is provided with upper and lower notches 29 and 30. The lower notch 30 is engaged with the transverse fastening device 25, and the upper notch 29 receives a transverse screw 31, preferably tapered as shown and adapted to clamp the block or piece 26 tightly against the lower fastening device 25. This particular construction enables a shovel, rake, or other implement to be readily attached to and removed from the standard. Also there will be no liability of a shovel or other implement twisting on the standard even should the tapered screw become loose, as the flat sides of the block fit snugly between the spaced side portions of the standard.

Having thus fully described my invention, what I claim as new and desire to secure by Letters Patent, is:—

A plow of the class described including spaced inclined handle bars, a ground wheel mounted between the lower portions of the handle bars, side beams connected to and extending rearwardly from the lower portions of the handle bars and spaced apart to permit the ground wheel to revolve between the same, a brace composed of two bars having laterally inclined divergent upper portions and provided with straight lower portions secured flat against each other, the upper inclined portions being connected to the inclined handle bars and the straight lower portions being slidable through the space between the side beams, and a spiral spring having its coils arranged on the straight lower portions of the bars of the brace and interposed between the upper inclined portions and the said side beams and yieldably supporting the handle bars.

In testimony, that I claim the foregoing as my own, I have hereto affixed my signature in the presence of two witnesses.

JAMES EDWIN GIBBS.

Witnesses:
  G. B. GROESBECK,
  VIRGINIA LENSE.

---

Copies of this patent may be obtained for five cents each, by addressing the "Commissioner of Patents, Washington, D. C."